Feb. 7, 1939.   E. C. HORTON   2,146,213
MOTOR VEHICLE
Filed March 11, 1935
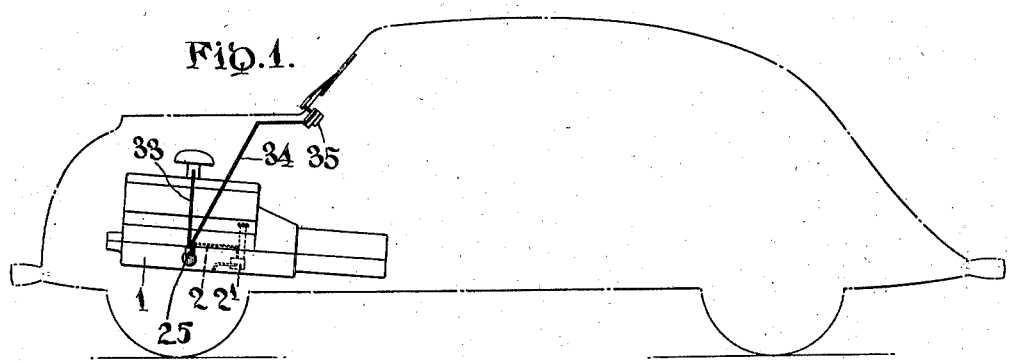
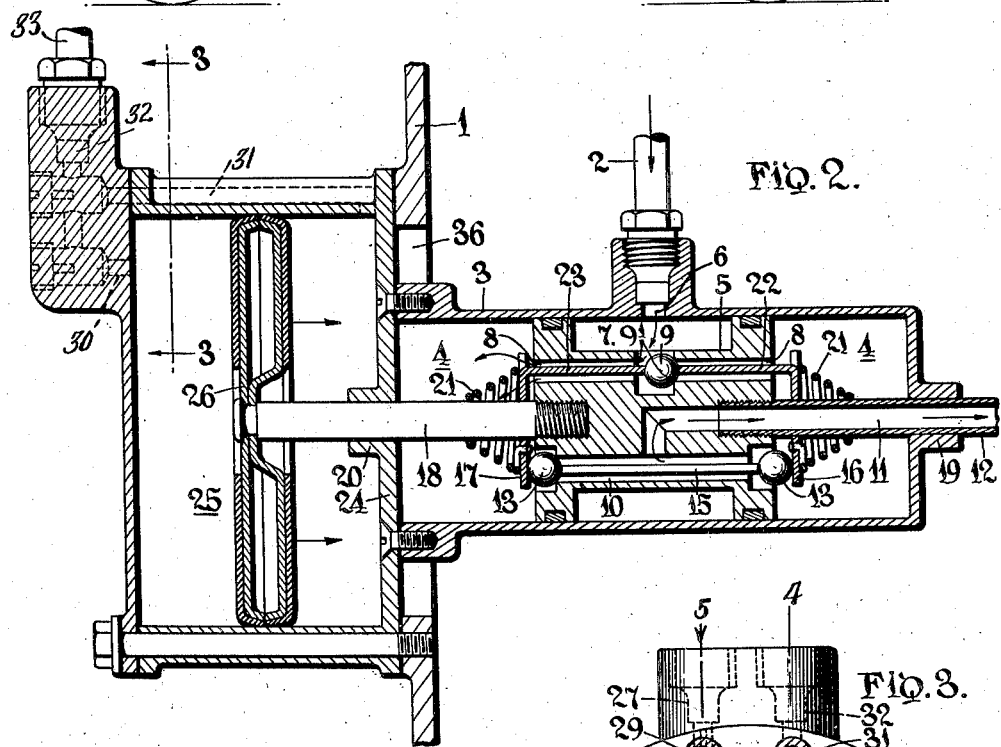
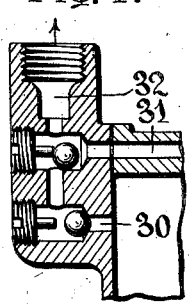
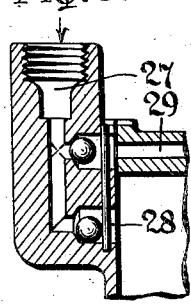
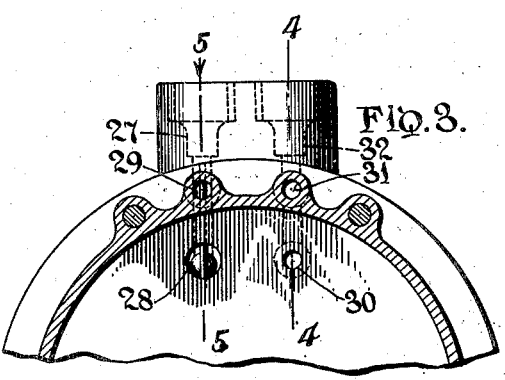
INVENTOR
Erwin C. Horton,
BY
Beau, Brooks, Buckley & Beau
ATTORNEYS Patented Feb. 7, 1939

2,146,213

UNITED STATES PATENT OFFICE 2,146,213

MOTOR VEHICLE

Erwin C. Horton, Hamburg, N. Y., assignor to Trico Products Corporation, Buffalo, N. Y.

Application March 11, 1935, Serial No. 10,524

4 Claims. (Cl. 60—19)

This invention relates to a motor vehicle and has particular reference to the provision of a source of pressure for the operation of fluid pressure operated accessories for motor vehicles.

The present invention has for its primary object to provide a source of pressure for the operation of accessories wherein the pressure producing unit is operated by the circulating liquid in the force-feed lubricating system of the motor vehicle power plant.

It has heretofore been proposed to utilize the lubricant pressure for the operation of a small motor but the apparatus heretofore employed has been impractical and inefficient for various reasons among which is the failure of the lubricant to function properly as a source of power. This has been caused, to some extent, by the lubricant failing to maintain a substantially constant fluidity. For instance, when the engine is cold and the lubricant somewhat congealed the movement of the same through extraneous passages is sluggish and even when the main body of the lubricant has become heated its movement is retarded as it passes through such passages and consequently its efficiency as a driving force is impaired.

The present invention aims to incorporate a motor unit in the power plant as a part thereof and in a manner to obtain the greatest efficiency from the lubricating system as a source of power.

The invention further has for its object to provide an improved motor pump unit which will be durable in construction and practical in operation as a reliable and satisfactory source of fluid pressure for the operation of pressure actuated accessories.

In the drawing, Fig. 1 is a phantom view of a motor vehicle equipped with an accessory system embodying the present invention;

Fig. 2 is a longitudinal, sectional view through a motor pump unit embodying one form of the invention;

Fig. 3 is a fragmentary cross sectional view about on a line 3—3 of Fig. 2; and

Figs. 4 and 5 are sectional views through the respective pump valves of the unit as viewed on lines 4—4 and 5—5 of Fig. 3.

Referring more particularly to the drawing, the numeral 1 designates the wall of the engine crank case which latter serves as a reservoir for the lubricating system, and 2 a branch conduit from the oil pump 2' at the outlet or delivery side thereof, so that the lubricant passing through the conduit 2 will be heated by the warm temperature within the crank case thereby to maintain the fluidity of the lubricant substantially constant and enable it to exert its full force and pressure when delivered into motor chamber 4 of the unit.

The fluid motor of the unit comprises a casing 3 having the chamber 4 in which the piston 5 reciprocates, the conduit 2 delivering the liquid into the piston chamber through an inlet opening 6. The particular motor herein shown, for the purpose of illustration, has the piston provided with an annular passage 7 which communicates through longitudinal passages or ports 8 to the chamber 4 at the opposite sides of the piston, a valve 9 being interposed between spaced seats 9' for alternate engagement therewith whereby the flow of the liquid lubricant will be first to one side of the piston and then to the opposite side thereof. An outlet passage or port 10 is provided in the piston to establish communication between the chamber 4 at opposite sides of the piston and the outlet passage 11 which latter leads through a piston rod 12 out into the crank case chamber. Valves 13 alternately seat over the opposite ends of the conduit 10 whereby exhaust communication with the chamber 4 will be established at one side only of the piston and this opposite to the inflow.

A spacer member 15 spaces the outlet valves 13 to insure such alternate seating of the same as they are alternately pushed to their seats by the collars 16 and 17 which are respectively slidable on the oppositely extending piston rods 12 and 18. These piston rods are slidable through bearings 19 and 20 in the end walls of the chamber 4. The plates 16 and 17 are backed by springs 21 which are slidable on the rods for being compressed during reciprocation of the piston after they engage the adjacent end walls of the chamber. When predeterminedly compressed such spring will act to shift the respective one of plates 16 and 17. These plates are provided with fingers 22 and 23 which extend inwardly through the inlet ports 8 and against the valve 9.

Consequently, as the fluid pressure enters to the left, in Fig. 2, the piston will be forced to the right, and the liquid ahead of the piston will be forced from the chamber 4 out through the tubular piston rod 12 and into the crank case for recirculation in the lubricating system. As the piston continues its movement, the advancing spring 21 will contact with the adjacent end wall of the chamber and compress sufficiently to overcome the forces tending to hold the seated valves engaged with their seats whereupon the valves will be reversed so that the inflowing liquid under pressure will pass into the right-hand end of the chamber 4 and move the piston to the left. This causes the liquid in advance of the piston at the left side thereof to be forced out through the outlet port 10 and back into the crank case.

The piston rod 18 extends through the end wall of the chamber 4 into a pump chamber 25 to support the plunger 26 of a double acting air pump. The end wall 24 may be common to both chambers and serve to support the entire unit on the wall 1 of the crank case. The pump is preferably double acting and therefore the inlet passage 27 will open into the opposite ends of the pump chamber through valved ports 28 and 29. The valved outlet ports 30 and 31 will merge into a discharge passage 32. Where the pump is of the suction type and is to supplement or replace the intake manifold suction of the internal combustion power plant as a source of suction, the outlet passage 32 will be connected to the intake manifold by the conduit 33 or it may discharge directly into the atmosphere. The inlet passage 27 will be connected by conduit 34 to the pressure or suction operated accessory 35.

The installation of the motor pump unit is such that the heat from the engine may readily be transmitted to the motor unit so as to insure a uniform fluidity of the lubricant for the greatest efficiency in the operation of the motor. According to the present disclosure, the motor part of the unit is disposed within the crank case, the same extending from the head wall 24 through an opening 36 in the crank case wall and may be submerged more or less wholly within the oil bath or content therein. This arrangement secures the greatest efficiency from the unit since the oil flow is uniform at practically all times of engine operation and therefore its transmission of power from the oil system pump to the motor is reliable for the production of an adequate supply of air under pressure by the air pump 25.

What is claimed is:

1. A motor vehicle having a power plant of the internal combustion type and provided with a crank case and a force feed lubricating system including an oil pump, the crank case adapted for containing a supply of lubricating oil and provided in its side wall with an opening, a fluid pressure actuated accessory system including an air pump for supplying the accessory with operating pressure, and a motor for operating the air pump and having an inlet connected to the oil pump outlet with valve mechanism for operatively directing the pumped oil to actuate the motor, said air pump and motor being mountable on the crank case as a unit with the motor exposed through the crank case opening to the interior thereof.

2. A motor vehicle having a power plant of the internal combustion type and provided with a crank case and a force feed lubricating system including an oil pump, the crank case adapted for containing a supply of lubricating oil and provided in its side wall with an opening, a fluid pressure actuated accessory system including an air pump for supplying the accessory with operating pressure, and a motor for operating the air pump and having an inlet connected to the oil pump outlet with valve mechanism for operatively directing the pumped oil to actuate the motor, said motor being carried by the air pump for mounting and demounting on the crank case over the opening thereof with the motor extending from the air pump into the crank case.

3. A motor vehicle having a power plant of the internal combustion type and provided with a crank case and a force feed lubricating system including an oil pump, the crank case adapted for containing a supply of lubricating oil and provided in its side wall with an opening, a fluid pressure actuated accessory system including an air pump for supplying the accessory with operating pressure, and a motor for operating the air pump operatively connected thereto and having an inlet connected to the oil pump outlet with valve mechanism for operatively directing the pumped oil to actuate the motor, said motor being mounted on the crank case over the opening thereof and extending into the crank case.

4. A motor vehicle having an internal combustion power plant with a force feed liquid circulating system including a liquid circulating pump, a fluid pressure actuated accessory system including an air actuated accessory and an air pump connected by an air passage to the accessory for providing the necessary air pressure differential to operate the accessory, and a motor for driving the air pump connected positively therewith, said motor having an inlet and an outlet connected in the liquid circulating system and comprising a chamber adapted to be filled with the circulating liquid for moving the liquid actuated member of the motor to drive the air pump and also to expel the spent liquid from the opposite side of said member whereby the liquid is uniform in its circulatory flow through the motor, said accessory having a part movable by the air pressure differential, and the air column between the air pump and the accessory acting to modify the action of the incompressible liquid on the accessory.

ERWIN C. HORTON.